(12) United States Patent
Sapatnekar et al.

(10) Patent No.: US 9,665,680 B2
(45) Date of Patent: May 30, 2017

(54) CELL-LEVEL SIGNAL ELECTROMIGRATION

(71) Applicants: Regents of the University of Minnesota, Minneapolis, MN (US); Palkesh Jain, Bangalore (IN); Gracieli Posser, Porto Alegre (BR); Ricardo Reis, Porto Alegre (BR)

(72) Inventors: Sachin S. Sapatnekar, Minneapolis, MN (US); Vivek Mishra, Minneapolis, MN (US); Palkesh Jain, Bangalore (IN); Gracieli Posser, Porto Alegre (BR); Ricardo Reis, Porto Alegre (BR)

(73) Assignee: Regents of the University of Minnesota, Minneapolis, MN (US)

( * ) Notice: Subject to any disclaimer, the term of this patent is extended or adjusted under 35 U.S.C. 154(b) by 132 days.

(21) Appl. No.: 14/292,215

(22) Filed: May 30, 2014

(65) Prior Publication Data

US 2015/0347665 A1 Dec. 3, 2015

(51) Int. Cl.
*G06F 17/50* (2006.01)

(52) U.S. Cl.
CPC ...... *G06F 17/5081* (2013.01); *G06F 17/5072* (2013.01); *G06F 17/5077* (2013.01); *G06F 2217/06* (2013.01); *G06F 2217/08* (2013.01); *G06F 2217/78* (2013.01); *G06F 2217/82* (2013.01)

(58) Field of Classification Search
CPC ............... H01L 23/528; H01L 27/0207; H01L 23/5226; H01L 21/76832; G06F 17/5081; G06F 17/5068; G06F 2217/78; G06F 11/008; G06F 2217/82; G06F 17/5022
USPC ................................ 716/120, 133, 136, 139
See application file for complete search history.

(56) References Cited

U.S. PATENT DOCUMENTS

| | | |
|---|---|---|
| 5,587,923 A | 12/1996 | Wang |
| 5,742,510 A | 4/1998 | Rostoker et al. |
| 6,014,506 A | 1/2000 | Hossain et al. |
| 6,512,708 B1 | 1/2003 | Hsuan et al. |
| 8,099,702 B2 | 1/2012 | Hou et al. |
| 8,438,519 B2 | 5/2013 | Park |
| 2006/0095870 A1* | 5/2006 | Tai ...................... G06F 17/5068 716/120 |

(Continued)

OTHER PUBLICATIONS

Banerjee, K., et al., "Global (interconnect) warming", IEEE Circuits and Devices Magazine, vol. 17, No. 5, pp. 16-32, Sep. 2001.

(Continued)

*Primary Examiner* — Nghia Doan
(74) *Attorney, Agent, or Firm* — Theodore M. Magee; Westman, Champlin & Koehler, P.A.

(57) ABSTRACT

A circuit design system includes a simulator that determines an average charging current provided by each current insertion point in a cell and an average charging current along a path in the cell between a reference pin position and a candidate pin position. A candidate pin placement tester updates the average charging current along the path by adding the average charging current of each insertion point to the average charging current along the path to produce an updated average charging current along the path and uses the updated average charging current along the path to determine a time to failure for the cell.

19 Claims, 8 Drawing Sheets

(56) References Cited

U.S. PATENT DOCUMENTS

2009/0031264 A1* 1/2009 Rittman .............. G06F 17/5081
716/106

OTHER PUBLICATIONS

Choi, Z., et al., "Activation energy and prefactor for surface electromigration and void drift in Cu interconnects", Journal of Applied Physics, vol. 102, No. 8, 6 pages, Oct. 2007.

Gan, C.L., et al., "Experimental characterization and modeling of the reliability of three-terminal dual-damascene Cu interconnect trees," Journal of Applied Physics, vol. 94, No. 2, pp. 1222-1228, Jul. 2003.

Hu, C. et al., "Impact of Cu microstructure on electromigration reliability", International Interconnect Technology Conference, IEEE, 2007, pp. 93-95.

Jain, P. et al., "Accurate current estimation for interconnect reliability analysis", IEEE Transactions on Very Large Scale Integration Systems, vol. 20, No. 9, pp. 1634-1644, Sep. 2012.

Lee, K-D., "Electromigration recovery and short lead effect under bipolar- and unipolar-pulses current", In Proceedings of the IEEE International Reliability Physics Symposium, pp. 6.B.3.1-6.B.3.4, 2012.

Li, D., et al., "Variation-aware electromigration analysis of power/ground networks", Proceedings of the IEEE/ACM International Conference on Computer-Aided Design, pp. 571-576, 2011.

Park, Y.J., et al., "New electromigration validation: Via node vector method", in Proceedings of the International Reliability Physics Symposium (IRPS), pp. 698-704, 2010.

Xie, J., et al. "Mitigating electromigration of power supply networks using bidirectional current stress," in Proceedings of the Great Lakes Symposium on VLSI, 2012, pp. 299-302.

Black, Electromigration—A Brief Survey and Some Recent Results, IEEE Transactions of Electron Devices, vol. ED-16, No. 4, pp. 338-347, 1969.

Lienig, Electromigration and its Impact on Physical Design in Future Technologies, Proceedings of the ACM International Symposium on Physical Design, pp. 33-40, 2013.

Nastase, How to Derive the RMS Value of a Triangle Waveform, http://masteringelectronicsdesign.com/how-to-derive-the-rms-value-of-a-triangle-waveform, 5 pages, 2010.

Mishra, The Impact of Electromigration in Copper Interconnects on Power Grid Integrity, Proceedings of the ACM/EDAC/IEEE Design Automation Conference, 6 pages, 2013.

Stine, FreePDK: An Open-Source Variation-Aware Design Kit, IEEE International Conference on Microelectronic Systems Education, pp. 173-174, 2007.

FreePDK45 Process Design Kit, http://eda.ncsu.edu/wiki/FreePDK45:Contents, 2 pages, 2014.

Nangate, 45nm Open Cell Library, http''//www.nangate.com, 1 page, 2014.

* cited by examiner

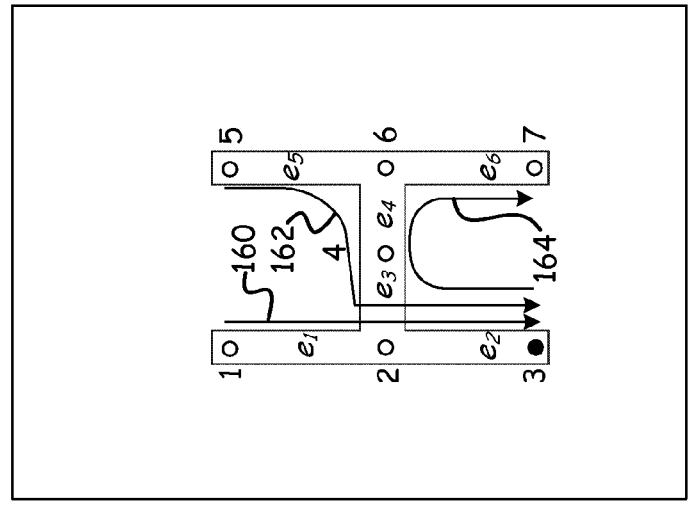
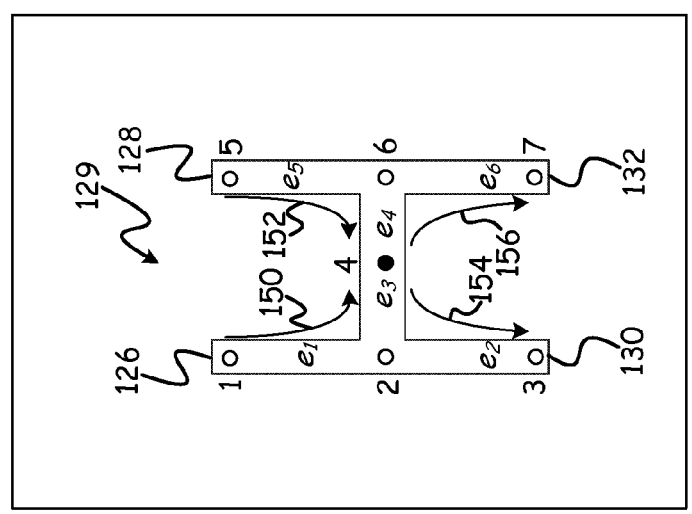
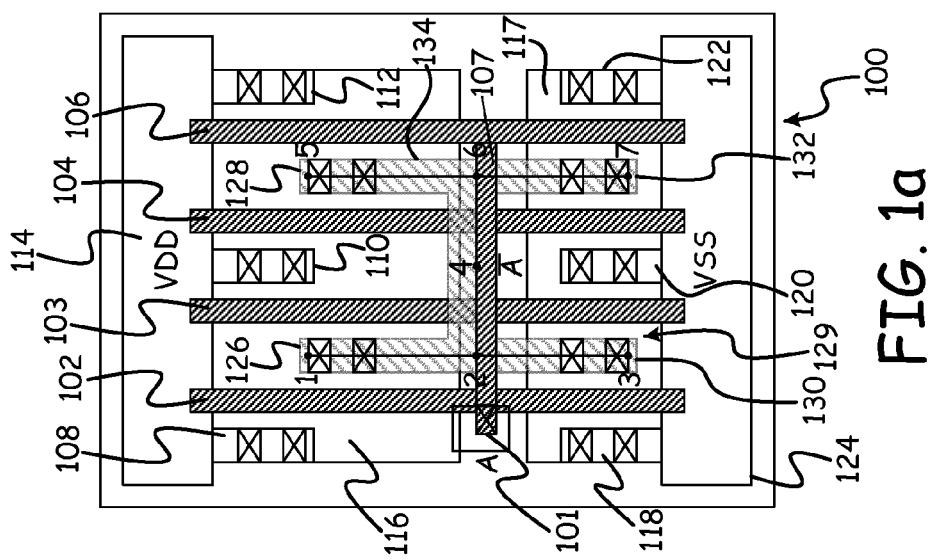

CELL-LEVEL SIGNAL ELECTROMIGRATION

BACKGROUND

In cell-based integrated circuit design, a library of predefined physical structures, known as cells, is provided. Each cell performs a particular function such as NOR, NAND, and INV, for example. The physical structures typically include one or more transistors that are defined in base layers of the integrated circuit and are interconnected by one or more metal or via layers. During circuit design, a node level description of the circuit, known as a netlist, is produced that describes how the inputs and outputs of the cells are to be connected in order to perform one or more higher-level functions. Using the netlist, a placement tool selects the best position for each cell in a layout area. A routing tool then adds signal connect lines to connect the inputs and the outputs of the cells to each other according to the netlist. The signal connect lines are connected to the cells through vias in the cells that are referred to as input or output pins. Some cells have multiple vias that can be used as pin locations during routing. The routing tool selects the best pin locations for the circuit as a whole based on considerations such as parasitic capacitance and timing.

Electromigration (EM) is the transport of metal atoms when an electric current flows through a metallic structure in an integrated circuit (IC). For instance, EM can cause metal atoms to be removed from a portion of a metal trace thereby creating a void and possibly an open-circuit failure in the integrated circuit.

Traditionally, EM has been a significant concern in power delivery networks, where the direction of current flow is generally unidirectional, resulting in a steady migration pattern over time. Of late, two new issues have emerged. First, it has become increasingly important to consider the effects of electromigration in signal wires, where the direction of current flow is bidirectional (for this reason, this is often referred to as AC EM), due to increased current densities and Joule heating effects that accelerate EM. Second, traditional EM analysis has focused on higher metal layers that connect the cells together. However, with shrinking wire dimensions and increasing currents, the current densities in lower metal layers within the cells are also now in the range where EM effects are visible. EM effects are visible at effective current densities of about 1 MA/cm$^2$.

SUMMARY

One exemplary aspect of the present disclosure relates to a circuit design system, which includes a simulator that determines an average charging current provided by each current insertion point in a cell and an average charging current along a path in the cell between a reference pin position and a candidate pin position. A candidate pin placement tester updates the average charging current along the path by adding the average charging current of each insertion point to the average charging current along the path to produce an updated average charging current along the path. The candidate pin placement tester then uses the updated average charging current along the path to determine a time to failure for the cell.

Another exemplary aspect relates to a method that invalidates candidate pin placements for a plurality of cells based on times to failure for segments of traces in each cell due to electromigration. At least one additional candidate pin placement for at least one cell is invalidated based on Joule heating of a segment. Cells are placed and interconnects are routed between the cells to form a circuit without using invalidated candidate pin placements.

A further aspect relates to a system that places and interconnects cells using reference pin positions for each cell. The system then identifies a time to failure for each cell due to electromigration for a plurality of pin positions and determines which pin position results in the longest time to failure for the cell. The system identifies, over all cells, the shortest longest-time-to-failure and, in each cell in the circuit, invalidates pin positions that result in times to failure that are shorter than the shortest longest-time-to-failure. The system then places and interconnects the cells by selecting from a set of candidate pin positions that excludes the invalidated pin positions.

BRIEF DESCRIPTION OF THE DRAWINGS

FIG. 1a is a layout of an inverter cell.

FIG. 1b shows charging and discharging currents along a metal trace of the cell of FIG. 1a for an output pin at node 4.

FIG. 1c shows charging and discharging currents along a metal trace of the cell of FIG. 1a for an output pin at node 3.

FIG. 2 shows charging and discharging currents depicting divergence along a portion of the metal trace of FIG. 1a.

DETAILED DESCRIPTION

Figure 2:
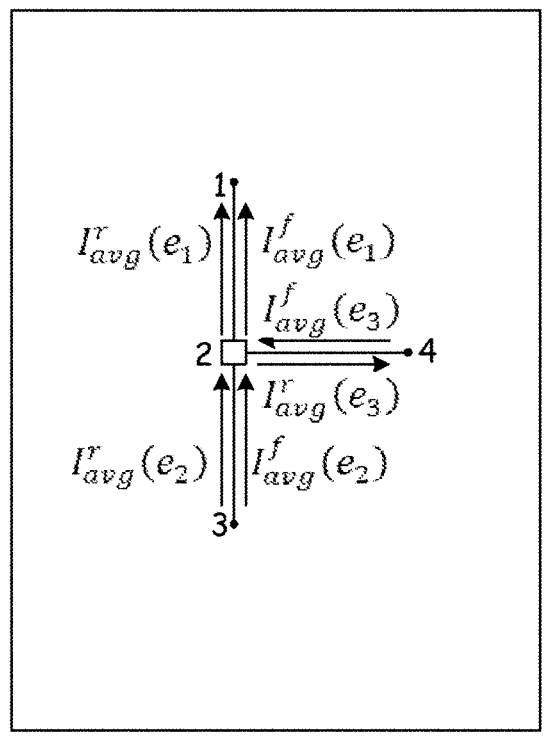

Embodiments of this disclosure identify pin placements within cells that would shorten the lifespan of a circuit due to electromigration. These pin locations are marked as being invalid before a routing operation begins so that the router cannot select the invalid pin locations when placing the signal connect lines. By not using the invalid pin locations, these embodiments improve the possible lifespan of the circuit.

The process for identifying the pin locations that would shorten the lifespan of the circuit begins with standard cell placement and routing to generate an initial placement of the cells and initial signal connect lines. During the initial routing, the routing tool is free to select any pin location on the cells. A simulation is then performed on the circuit using the pin locations selected by the routing tool. The simulation provides current values for various pathways within each cell. These currents are then used to identify currents that would flow along the pathways if the pin location of the cell was moved to another location. For each possible pin location in each cell, a time-to-failure is determined based on electromigration along the pathways. Based on the times-to-failure, one or more pin locations are invalidated and the routing tool is executed again to provide new signal connect lines that do not use the invalidated pin locations.

FIG. 1a provides a layout 100 of an example cell that is used below to describe the various embodiments. Layout 100 is for an inverter cell with four pull-up and four pull-down transistors, referred to as INV_X4. Layout 100 is taken from a 45 nm NANGATE Open cell library, described at http://www.nangate.com. Layout 100 is only one example of a possible cell layout and the various embodiments are not limited to layout 100 or to the 45 nm NANGATE Open cell library.

In layout 100, an input signal A is connected to a polysilicon structure 101 that consists of polysilicon members 102, 103, 104 and 106 that are connected together by polysilicon member 107. The upper half of layout 100 provides a p-diffusion area 116 with metal contacts 108, 110 and 112 that extend from VDD power supply rail 114. The lower half of layout 100 provides an n-diffusion area 117 with metal contacts 118, 120, and 122 extending from VSS power supply rail 124. An H-shaped metal net 129 provides contacts areas 126, 128, 130 and 132 that connect to the transistors. An output $\overline{A}$, representing the inverse of input signal A, is provided on H-shaped metal net 129.

Layout 100 includes four parallel transistors for the pull-up (polysilicon over p-diffusion in the upper half of the figure) and four for the pull-down (polysilicon over n-diffusion in the lower half of the figure). In particular, a first pull-up transistor is formed through metal contact 108, polysilicon member 102 and contact area 126, a second pull-up transistor is formed through metal contact 110, polysilicon member 103 and contact area 126, a third pull-up transistor is formed through metal contact 110, polysilicon member 104 and contact area 128, and a fourth pull-up transistor is formed through metal contact 112, polysilicon member 106 and contact area 128. A first pull-down transistor is formed through metal contact 118, polysilicon member 102 and contact area 130, a second pull-down transistor is formed through metal contact 120, polysilicon member 103 and contact area 130, a third pull-down transistor is formed through metal contact 120, polysilicon member 104 and contact area 132, and a fourth pull-down transistor is formed through metal contact 122, polysilicon member 106 and contact area 132.

FIG. 1b shows H-shaped metal net 129 in isolation. The positions where an output pin can be placed are numbered 1 through 7, with each position representing a via in an insulating layer. The output pin provides a connection between the cell of FIG. 1a and other elements of the circuit. Edges or segments of H-shaped metal net 129 are labeled $e_1$ through $e_6$. Alternative terms for the edges include traces or leads. Contact areas 126, 128, 130 and 132 each act as either a current injection point for H-shaped metal net 129 or a current sink point for H-shaped metal net 129 by either providing current to H-shaped metal net 129 from two transistors or sinking currents from the net to two transistors. In this example, since the four PMOS transistors are all identical, by symmetry, the currents injected at contact areas 126 and 128 are equal; similarly, the NMOS currents sunk at contact areas 130 and 132 are equal.

When the output pin is at node 4, the dominant charging currents 150 and 152 and the dominant discharging currents 154 and 156 flow toward and away from node 4 as shown in FIG. 1b. Moving the output pin changes the current on some of edges $e_1$-$e_6$. For example, if the pin is moved to node 3 (FIG. 1c), the charging and discharging currents on edges $e_2$ and $e_3$ change. In particular, during charging of the output load, the current on edge $e_3$ changes from dominant charging current 150, which moves from left-to-right when the output pin is at node 4 in FIG. 1b, to dominant charging current 162, which moves from right-to-left when the output pin is at node 3 in FIG. 1c. On edge $e_2$, the charging current changes from dominant charging current 154 (FIG. 1b) to the sum of dominant charging currents 160 and 162 (FIG. 1c). During discharging of the output load, the currents on both $e_2$ and $e_3$ change from dominant discharging current 154 in a first direction (FIG. 1b) to dominant discharging current 164 in the opposite direction (FIG. 1c).

In many embodiments, the dominant charging currents are similar to each other and similar to the dominant discharging currents. Thus, dominant charging current 150 is similar to dominant charging currents 152, 160 and 162 and dominant discharging currents 154, 156 and 164. When the dominant charging and discharging currents have similar values, the dominant charging current in edge $e_2$ of FIG. 1c, resulting from the sum of dominant charging currents 160 and 162, is twice as large as the dominant charging current in any other edge and twice as large as the dominant discharging current 164. If the edges have similar structural shapes, this larger charging current results in a larger effective average current and effective RMS current and therefore, more electromigration and a lower lifetime for edge $e_2$. In fact, based on exact parasitic extraction of the layout including short-circuit and leakage currents, the average effective EM current through $e_2$ when the pin is at node 3 is 1.17 times larger than when the pin is at node 4. Accounting for Joule heating, this results in a 19% lifetime reduction.

In other embodiments, one or more of the dominant charging currents or dominant discharging currents may be different from each other. Such differences can increase or decrease the lifetime reduction caused by moving the pin location.

Modeling Cell-Internal EM
Modeling Time-to-Failure Under EM

In one exemplary embodiment, EM is computed using Black's equation:

$$TTF = AJ^{-n}\exp\left(\frac{Q}{k_B T_m}\right) \tag{1}$$

where TTF is the time-to-failure, A is an empirical constant that depends on the material properties of the edge or segment, J is the current density, the exponent n is typically between 1 and 2, Q is the activation energy, $k_B$ is Boltzmann's constant and $T_m$ is the metal temperature. The current density is described as $J=I_{avg}/(T_w \cdot W)$, where W and $T_w$ are the wire width and thickness and $I_{avg}$ is the average current.

For wires with unidirectional current flow (e.g., many power grid wires), EM causes a steady unidirectional migration of metal atoms, and $I_{avg}$ is simply the time average of the current. In contrast, currents in signal wires may flow in both directions as they charge and discharge the output load. Here, the motion of atoms under one direction of current flow is negated by the "sweep-back" effect that moves atoms in the opposite direction when the current is reversed.

For signal nets with bidirectional current flow, the time-average of the current waveform is often close to zero. However, even in cases where the current in both directions is identical, it is observed that EM effects are manifested. This is because a reverse-direction current only allows partial recovery of the EM degradation due to forward-direction current, and this effect is often referred to as recovery. This is captured by an effective average current, $I_{avg}$:

$$I_{avg}=I_{avg}^+ - R \cdot I_{avg}^-, \tag{2}$$

where R represents the recovery factor that captures the sweep-back due to reverse current. Here, $I_{avg}^+$ is the larger (forward-direction) of the average currents in either direction and $I_{avg}^-$ is the smaller current (reverse-direction).

For signal wires in a cell, the charging and discharging currents are not always in opposing directions. We consider two cases:

Case I: When the charging and discharging currents (also referred to as the rise and fall currents), $I_{avg}^r$ and $I_{avg}^f$, are in opposite directions, as in edge $e_3$ in FIG. 1b, Eq. (2) yields:

$$I_{avg} = \frac{\max(|I_{avg}^r|, |I_{avg}^f|) - \mathcal{R} \cdot \min(|I_{avg}^r|, |I_{avg}^f|)}{2} \quad (3)$$

where the factor of 2 arises because half the transitions correspond to a charging current (an output rise) and half to a discharging current (an output fall). In some embodiments the factor R is selected as 0.7.

Case II: When the charging and discharging currents are in the same direction (e.g., in edge $e_1$ in FIGS. 1b and 1c) then $$I_{avg} = \frac{|I_{avg}^r| + |I_{avg}^f|}{2} \quad (4)$$

Note that in FIGS. 1b and 1c, only the dominant charging and discharging currents are shown. The short-circuit currents present during charging and discharging are not shown.

Joule Heating

The flow of current in an edge results in an increase in temperature of the edge due to a phenomenon known as Joule heating. From Eq. (1), temperature rise hastens the EM-induced TTF. We compute the temperature of the edge, $T_m$ as:

$$T_m = T_{ref} + \Delta T_{Joule} \quad (5)$$

where $T_{ref}$ is the reference chip temperature for EM analysis and $\Delta T_{Joule}$ is the temperature rise due to Joule heating. In the steady-state, the temperature of an edge rises by:

$$\Delta T_{Joule} = I_{rms}^2 R R_\theta \quad (6)$$

Here, $I_{rms}$ is the root mean square (RMS) current in the edge, R is the resistance of the edge, and $R_\theta = t_{ins}/(K_{ins}LW_{eff})$ is the thermal impedance between the edge and the substrate, where $t_{ins}$ is the dielectric thickness of the insulator layer between the edge and the substrate, $K_{ins}$ is the thermal conductivity normal to the plane of the insulator layer, L is the length of the edge, and $W_{eff} = W + 0.88t_{ins}$, is the effective width of the edge for an edge width W.

Current Divergence

A via in a copper interconnect allows the flow of electrical current but acts as a barrier for the migration of metal atoms under EM. This implies that the average current $I_{avg}$ used for EM computation depends on the magnitude and direction of currents in neighboring wires where the metal migration flux is blocked by a via. The computation of the average EM current can be performed according to a flux-divergence criterion, which says that the average EM current for a wire is the sum of the current through the wire and the divergence at the via. For edges that end at a via, the average divergence current is used in place of the average current.

To illustrate the idea of current divergence at a via, consider the example of FIG. 2 showing the left half of the H-shaped INV_X4 output wire presented in FIGS. 1a-1c. The output pin is placed at node 2 and consequently a via is placed over this node. The arrows in FIG. 2 indicate the direction of electron flow of the current in this wire during the rise and fall transitions.

Poly-metal contacts (nodes 1, 3) are also blocking boundaries for metal atoms, and flux divergence must be used for wires at these nodes. If an edge has multiple vias (e.g., $e_1$ has vias at nodes 1 and 2), $I_{avg}$ uses the largest divergence.

Example: For edge $e_1$, the contact at node 1 is ignored since the rise and fall electron flow for $e_1$ are both towards the via, and EM voids are only caused by electron flow away from the via. However, for the via at node 2, there is effective outflow and the EM average current for edge $e_1$ with respect to via 2, $I_{avg,d}(e_1)$, is computed using Eq. (4) as:

$$I_{avg,d}(e_1) = (I_{avg,d}^r(e_1) + I_{avg,d}^f(e_1))/2$$

where $I_{avg,d}^r(e_1) = I_{avg}^r(e_1) - I_{avg}^r(e_2) + I_{avg}^r(e_3)$ $$I_{avg,d}^f(e_1) = I_{avg}^f(e_1) - I_{avg}^f(e_2) - I_{avg}^f(e_3) \quad (7)$$

Current Calculation

Thus, the evaluation of EM TTF requires a characterization of the average currents, $I_{avg}^r$ and $I_{avg}^f$, the RMS current $I_{rms}$ and for edges connected to vias, the average divergence current. For a cell with n pin positions, n SPICE simulations would normally be required to compute all currents. This can be expensive, e.g., n averages to 12 for the NANGATE library discussed above. Embodiments described herein provide a more efficient approach.

A key observation that leads to this more efficient approach is that if the currents along the edges have been determined for one pin position, known as the reference pin position, the only edges that will have a different current for a different pin position are those edges along a path between the reference pin position and the new pin position. Further, the change in the currents for that edge can be determined by adding all of the charging/discharging currents of the current injection and current sink points to the current determined for the edge for the reference pin position.

For example, consider INV_X4 in FIGS. 1a and 1b with the output pin at node 4. When the pin is moved to node 2, the currents in the edges remain fundamentally similar, except edge $e_3$, which now carries a charging current in the opposite direction and a discharging current in the opposite direction.

The charging current for the new pin placement at node 2 can be determined by first assigning signs to the currents such that currents to the left or up are negative currents and currents to the right or down are positive currents. Next, a sign is assigned to edge $e_3$ based on the direction traveled along the path from node 4 to node 2, which results in a negative sign being assigned to edge $e_3$ because the direction of travel is to the left. The charging current injected at contact area 126 is designated $I_1$ and the charging current injected at contact area 128 is designated $I_5$. The sign of edge $e_3$ is applied to each charging current injected by contact areas 126 and 128, resulting in $-I_1$ and $-I_5$. These signed charging currents are then added to the charging current determined for edge $e_3$ ($I_1$) when the pin was at node 4 resulting in $I_1 - I_1 - I_5 = -I_5$. This agrees with FIG. 1b where it can be seen that moving the reference pin from node 4 to node 2 removes dominant charging current 150 ($I_1$) from edge $e_3$ and adds dominant charging current 152 ($I_5$) flowing to the left. None of the other edges experiences a change in the charging current.

In another example, when the pin is moved from node 4 to node 3, the path from the reference pin to the new pin includes edges $e_2$ and $e_3$ with edge $e_2$ assigned a positive sign and edge $e_3$ assigned a negative sign. The charging current on edge $e_3$ when the pin is at node 4 includes a component of the current injected at contact area 126 (*I*) and there is no charging current along edge $e_2$. Adding the charging currents from contact areas 126 and 128 to each edge using the edge's assigned sign results in $I_1-I_1-I_5=I_5$ for edge $e_3$ and $I_1+I_5$ for edge $e_2$. This result agrees with the depiction of the charging currents in FIG. 1*c*. The only current magnitudes that are changed in this case are those in edges $e_2$ and $e_3$; those for the other edges remain almost the same since the intracell edge parasitics are small. Note that although the currents along the other edges do not change, the divergence currents of those edges may change if the edges share a via with an edge along the path from the reference pin position to the candidate pin position.

The examples above indicate that it should be possible to reduce the characterization effort by performing a single SPICE simulation for one pin position, called the reference case, and inferring the current densities for every other pin position from this data by determining the current redirection. Below a graph-based method for determining this redirection, and an algebra for computing $I_{avg}$ and $I_{rms}$ for each pin position based on the values from the reference case are described.

The reference case is characterized for a fixed reference clock frequency, $f_{ref}$, chosen to be 2 GHz in some embodiments. If a given design operates at a clock frequency f and an activity factor α, as long as the circuit operates correctly at that frequency (i.e., all transitions are allowed sufficient time to complete), it is easy to infer the average and RMS currents in each edge by scaling the average and RMS currents by multiplicative factors of $\alpha f/f_{ref}$ and $\sqrt{\alpha f/f_{ref}}$, respectively.

Current Flows Using Graph Traversals

Some embodiments utilize a graph-based algorithm that computes the currents through each edge when the pin position is moved from the reference case to another location. The algorithm captures the effect of charging/discharging currents and short-circuit currents and leakage currents (neglected in the example above). The short-circuit and leakage currents are unaffected by the pin location, but FIGS. 1*a*-1*c* show that the flow of the charging/discharging currents is affected by the output pin position. The essence of the algorithm is to use graph traversals to trace the change in the current path when the pin position is moved from the reference pin position, p, to any candidate pin position on the output net, as enumerated in a candidate set C.

Figure 3:
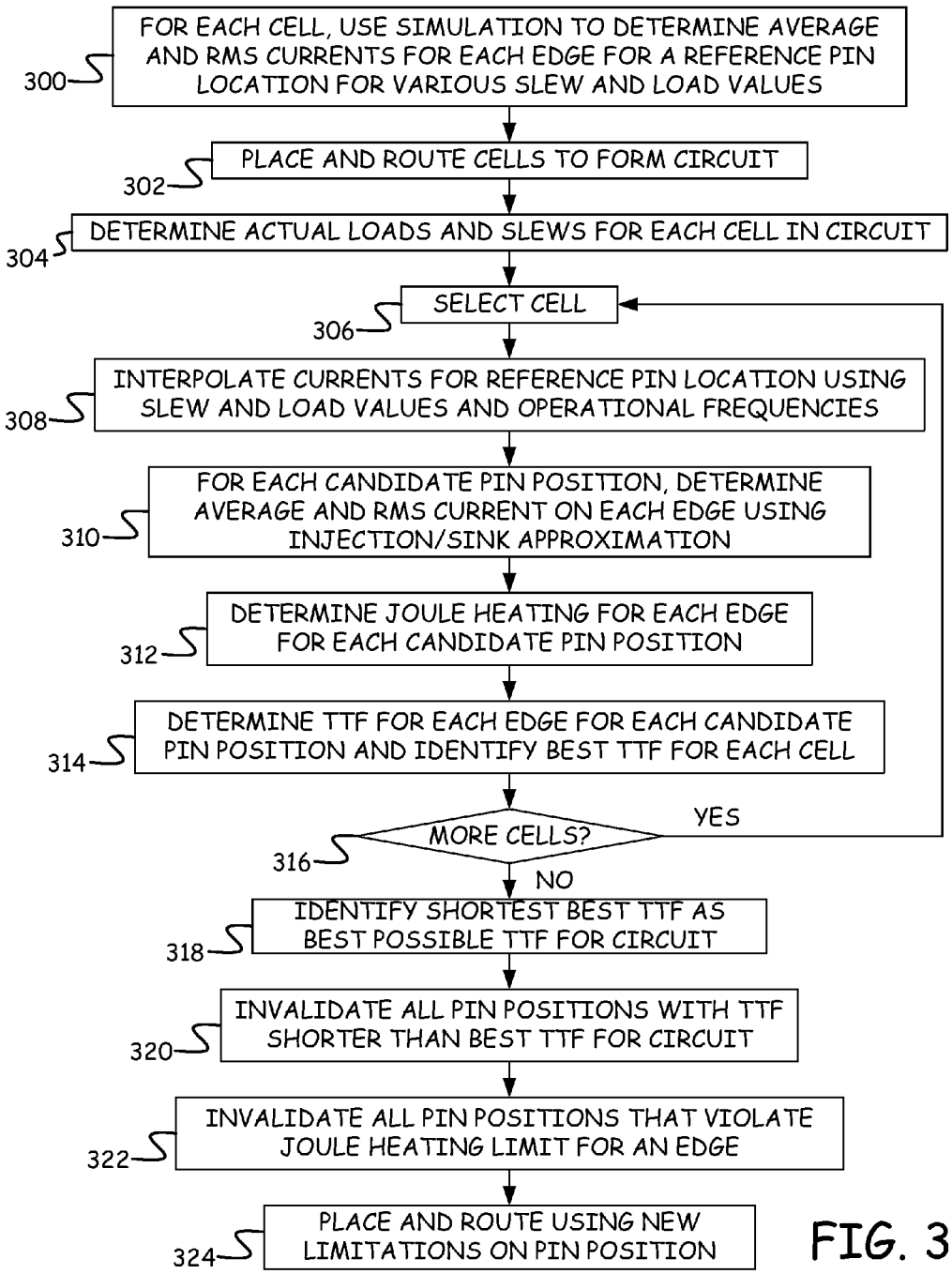
FIG. 3 provides a flow diagram of a method of placing cells and routing interconnects between cells.
Figure 4:
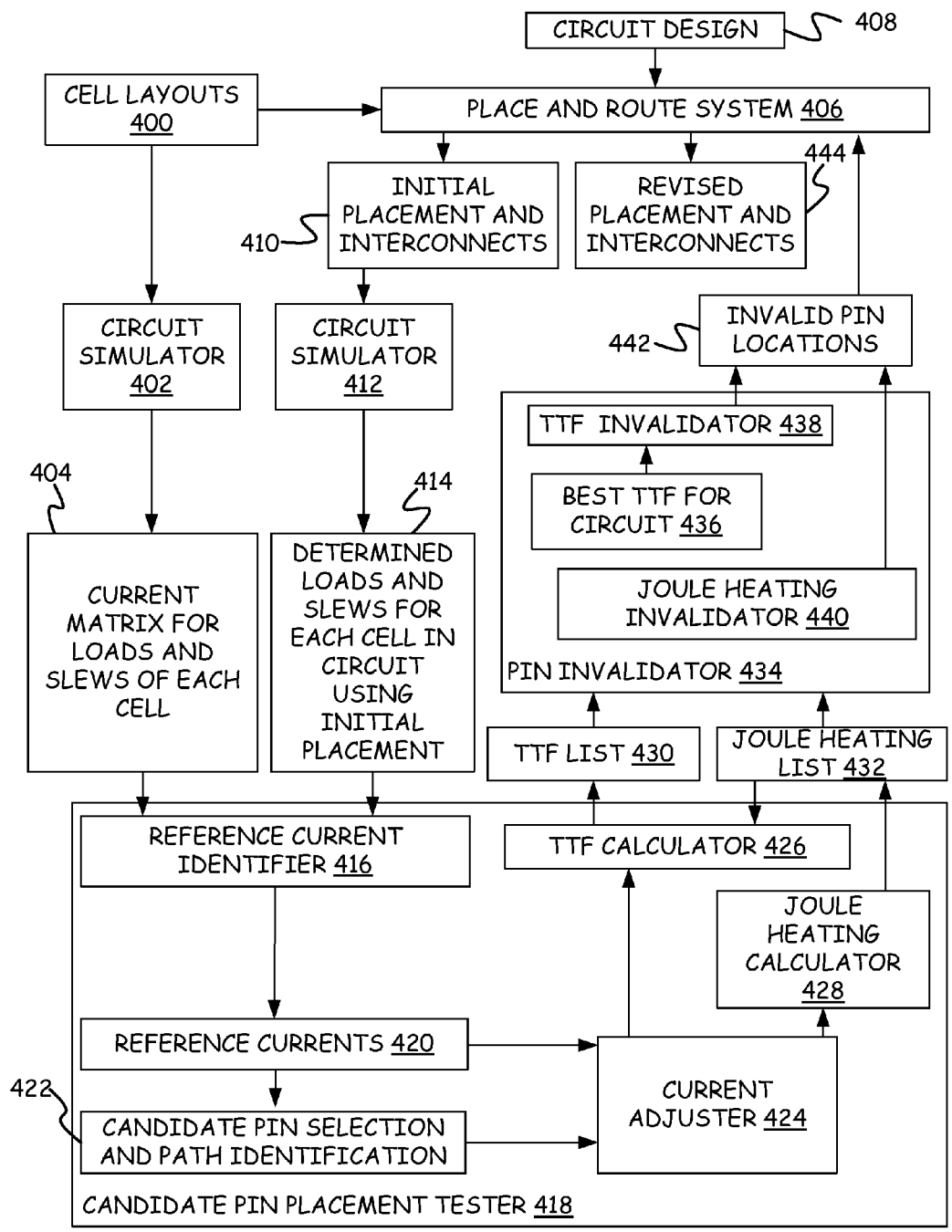
FIG. 4 provides a block diagram of elements used in the methods of FIGS. 3 and 5.
Figure 5:
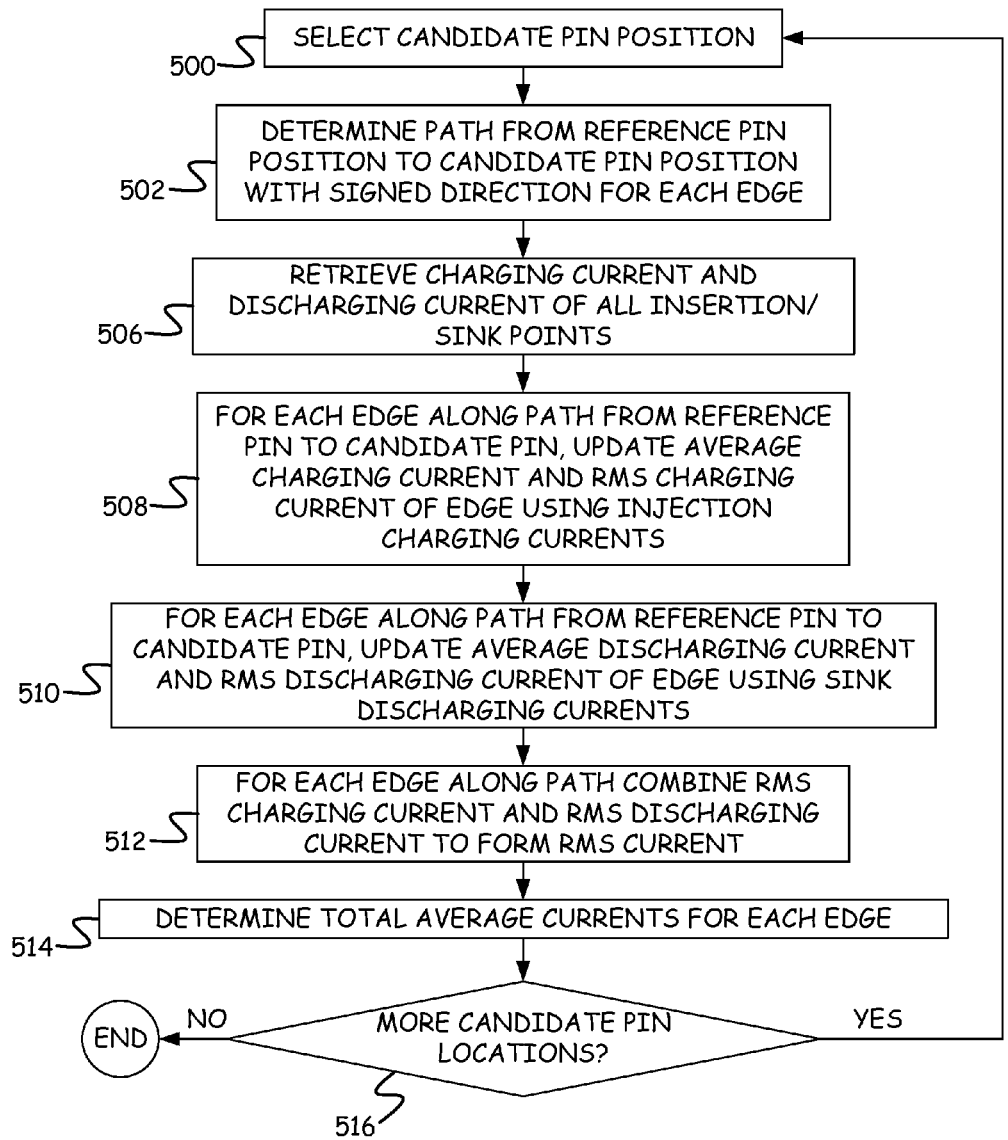
FIG. 5 provides a flow diagram of a method of determining changes in currents due to changes in pin locations in a cell.

FIGS. 3 and 5 provide flow diagrams depicting a method for analyzing and improving circuit lifetime under cell-internal EM, and FIG. 4 provides a block diagram of functional elements representing a circuit design system implemented by a processor to perform the method of FIGS. 3 and 5. At step 300, cell layouts 400 providing the geometry of each cell, including a reference output pin position, are used by a circuit simulator 402 to determine a matrix 404 of currents for each cell. In accordance with one embodiment, circuit simulator 402 is a SPICE simulator. During step 300, circuit simulator 402 works with one cell at a time and applies different combinations of output load and input slew to the cell. For each combination of output load and input slew, circuit simulator 402 determines the currents that flow along each edge of the cell and the currents provided at each current injection/sink point including charging/discharging currents, short-circuit currents and leakage currents. A current injection point is a location on a metal trace that is connected or coupled to one or more transistors and receives current from the transistor(s). A current sink point is a location on a metal trace that is connected or coupled to one or more transistors that draw current from the metal trace. The currents determined by the simulator are determined for both steady state and for output transitions at a reference clock frequency. Average currents and RMS currents along each edge and from each injection/sink point are also determined.

In one embodiment, the cells are characterized for a clock frequency $f_{ref}$=2 GHz and for seven different values each for the input slew and output load. The characterization thus generates a 7×7 look-up table or matrix 404 with the RMS and average current values for each edge and injection/sink point for each of the combinations of the slew and output load values.

At step 302, a place and route system 406 uses a circuit design 408 and cell layouts 400 to form an initial placement of cells and interconnect routings between cells 410 for the circuit. During this initial placement of cells and routing of interconnects, place and route system 406 is limited to using the reference pin positions used to form matrix 404. In accordance with one embodiment, Cadence® Encounter® Digital Implementation System is used as place and route system 406. Initial placement and interconnect routings 410 includes a Standard Parasitic Exchange Format (SPEF) file with the extracted wire RCs and a Verilog netlist, as well as Design Constraints such as timing, power, area and wire length for the placement and interconnects.

At step 304, a circuit simulator 412 reads the SPEF file, the Verilog netlist, and the Design Constraint files and reports the input slew, output load, and switching probability 414 for each cell in the circuit. In accordance with one embodiment, circuit simulator 412 is PrimeTime provided by Synopsys®.

At step 306, a cell instance in the circuit is selected and at step 308, a reference current identifier 416 in a candidate pin placement tester 418 interpolates currents in the selected cell using the determined output loads and input slews 414 and the current matrix 404. Specifically, reference current identifier 416 identifies the combinations of output load and input slew in matrix 404 that are closest to the determined output loads and input slews 414. In some embodiments, this involves identifying a single closest output load and two closest input slews for a total of two combinations of output load and input slew. In other embodiments, this involves identifying a single closest input slew and two closest output loads for a total of two combinations of output load and input slew. In still further embodiments, this involves identifying two closest input slews and two closest output loads for a total of four combinations of output load and input slew. Each current interpolation then involves forming an average or a weighted average of the current values for the identified combinations of output load and input slew in matrix 404. In addition, the interpolated average currents and RMS currents in some embodiments are scaled based on the activity and clock frequency of the cell determined by circuit simulator 412. For example, if the cell has an activity factor, a, and operates at a frequency f, and the currents in current matrix 404 were determined at an operational frequency, $f_{ref}$, then the average interpolated currents would be scaled by $\alpha f/f_{ref}$, and the RMS interpolated currents would be scaled by $\sqrt{\alpha f/f_{ref}}$. Step 308 produces reference currents 420, which include average and RMS reference currents for each edge as well as average and RMS charging currents for each injection point and average and RMS discharging currents for each sink point.

At step 310, currents are determined for each edge for each candidate pin position that could be used instead of the reference pin position. In accordance with one embodiment, the currents are determined using the method shown in the flow diagram of FIG. 5.

At step 500, a candidate pin selection and path identification unit 422 selects an alternative pin location as a candidate pin location and at step 502 identifies edges along a path from the reference pin location to the selected candidate pin location. In addition, each edge along the path is assigned a sign based on the direction of travel over the edge from the reference pin to the candidate pin. For example, if the direction of travel over an edge matches the direction of a negative current flow, a negative sign is assigned to the edge and if the direction of travel over the edge matches a direction of positive current flow, a positive sign is assigned to the edge.

At step 506, a current adjuster 424 retrieves the average and RMS charging current and discharging current 426 for the all insertion/sink points in the cell. At step 508, for each edge along the path from the reference pin position to the candidate pin position, current adjuster 424 updates the average charging current and RMS charging current for the edge using the insertion/sink charging currents and the sign assigned to the edge. At step 510, for each edge along the path from the reference pin position to the candidate pin position, current adjuster 424 updates the average discharging current and RMS discharging current for the edge using the insertion/sink discharging currents and the inverse of the sign assigned to the edge.

The average charging or discharging current, $I_{avg}$, along an edge e can be computed as:

$$I_{avg}(e) = \frac{1}{T/2} \int_0^{T/2} I(e)(t) \, dt = \frac{1}{T/2} \sum_{i \in S} \int_0^{T/2} I(p_i(e))(t) \, dt \quad (8)$$

where for an average charging current, the summation is over the set S of all current insertion points whose currents contribute to the current in edge e, T is 1/f where f is the output clock frequency of the cell, $p_i(e)$ is the current of current insertion point i, and the integral is taken over a half cycle indicating equal charging and discharging times during the cycle. For an average discharging current, the summation is over the set S of all current sink points whose currents contribute to the current in edge e, T is 1/f where f is the output clock frequency of the cell, $p_i(e)$ is the current of current sink point i, and the integral is taken over a half cycle indicating equal charging and discharging times during the cycle.

As discussed above, when the pin is moved, the set S of current insertion points and current sink points that contribute to the current in an edge is modified substantially only for those edges along the path from the reference pin position to the new pin position. The change in the set can be determined by adding, with appropriate sign for the edge, the average current provided by each insertion point:

$$(I(e))_{avg-updated} = \frac{1}{T/2} \int_0^{T/2} \left( I(e)(t) + \sum_{i \in Q} \pm I(p_i) \right) dt \quad (9)$$

$$(I(e))_{avg-updated} = \frac{1}{T/2} \int_0^{T/2} I(e)(t) \, dt + \frac{1}{T/2} \int_0^{T/2} \sum_{i \in Q} \pm I(p_i) \, dt$$

-continued $$(I(e))_{avg-updated} = I_{avg}(e) + \sum_{i \in Q} \pm \frac{1}{T/2} \int_0^{T/2} I(p_i) \, dt$$

$$(I(e))_{avg-updated} = I_{avg}(e) + \sum_{i \in Q} \pm I_{avg}(p_i)$$

where I(e)(t) is the current on edge e using the reference pin position, Q is the set of all current insertion points when determining the updated average charging current and Q is the set of all current sink points when determining the updated average discharging current, $I(p_i)$ is the current from/to current insertion/sink point i and $(I(e))_{avg-updated}$ is the updated average charging/discharging current along edge e. The sign applied to the average charging/discharging current, $I_{avg}(p_i)$, is the same as the sign assigned to the edge for current insertion points and the inverse of the sign assigned to the edge for current sink points. Therefore, $I_{avg}$ updates for a new pin position simply involve add/subtract operations on average reference case currents.

Updating the RMS current for an edge along the path involves a similar calculation. A typical current waveform in a cell may be approximated by a triangle with height $I_{pk}$, and with a nonzero current for a period of T' seconds, where T'<T, the clock period. The RMS value of such a waveform is:

$$I_{rms} = |I_{pk}| \sqrt{\frac{T'}{3T}} \quad (10)$$

Due to the tree structure of the output wire, the current in each edge is a sum or difference of a set of such triangular signals, and this set can be determined based on a tree traversal. The sum (or difference) of a set of triangular waveforms, potentially each with different heights, start times, and end times, can be represented as a piecewise linear waveform, and thus each edge current has this form. To find the RMS value of such a piecewise linear waveform, we can temporally decompose it into a set of nonintersecting (except at the edges) triangles and trapezoids, as shown in FIG. 6.

Figure 6:
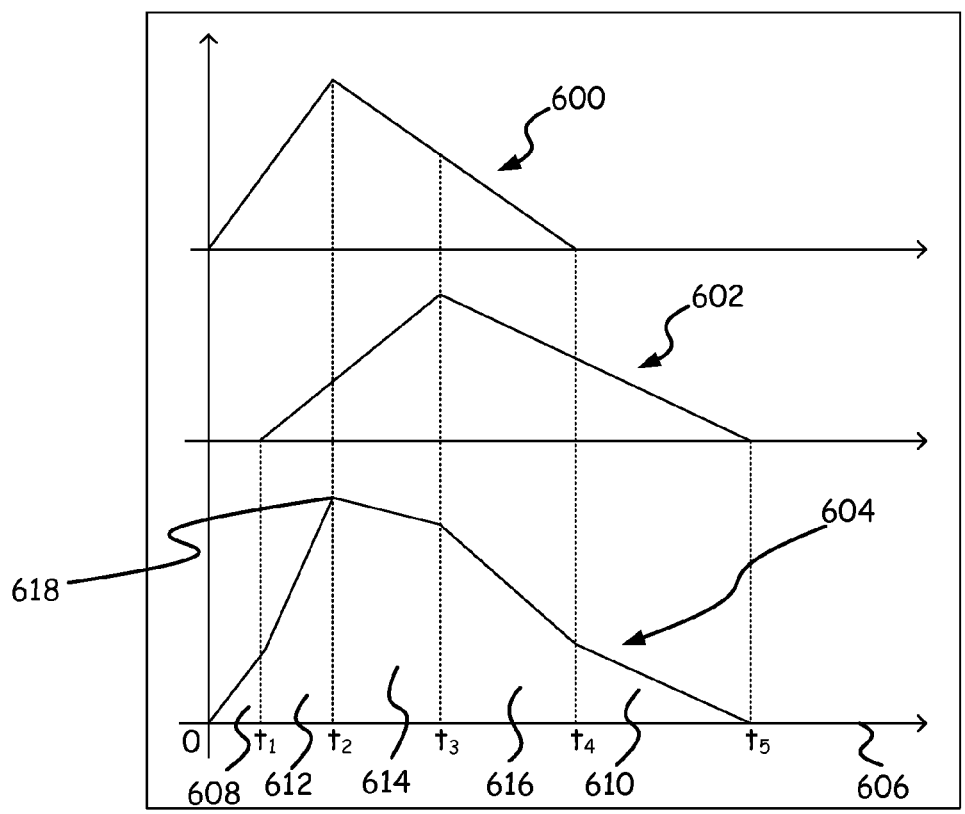
FIG. 6 provides a graph of current waveforms combined to form a composite waveform on an edge.

In FIG. 6, two triangular waveforms 600 and 602 are provided that represent the current signal of two current sinks along an edge. These two current signals are combined along the edge to form composite current signal 604. As shown along horizontal axis 606, at selected time points, $t_1$-$t_5$, the slope of composite current signal 604 changes. Between each of these time points, the shape of composite current signal 604 is either a triangle, such as triangles 608 and 610, or a trapezoid, such as trapezoids 612, 614 and 616. The RMS for waveform 604 can be shown to be;

$$I_{rms}^2 = \sum_{\text{all triangles } i} I_{rms,\Delta_i}^2 + \sum_{\text{all trapezoids } i} I_{rms,trap_i}^2 \quad (11)$$

To use the above equation, we use Eq. 10 for the RMS of a triangular waveform, such as triangular waveforms 608 and 610, and the following formula for the RMS of a trapezoid bounded by the time axis, with value $I_b$ at time b and $I_c$ at time c, where c>b:

$$I_{rms,trap} = \sqrt{\frac{(I_b^2 + I_b I_c + I_c^2)(c-b)}{3T}} \quad (12)$$

For INV_X4, since the transistors of each type are all identical and are driven by the same input signal, each PMOS [NMOS] device injects[sinks] an identical charging [discharging] current waveform; however in general, the currents may be different. Since the intracell parasitics of the output metallization are small, some combination of these nearly unchanged currents is summed up along each edge during each half-cycle. The set of triangular PMOS waveforms that contribute to the current in each edge in FIG. 1 is simply the set of PMOS devices i whose charge or discharge path traverses edge i. When the output is moved from node 4 to node 3, the current through an edge loses some set membership and gains others. The updated set of triangles add up, in general, to a waveform with triangles and trapezoids, whose RMS value is given by Equation (11).

As shown in FIG. 6, the composite current on an edge produces a waveform with a peak current 618. This peak current can be determined by comparing the composite current values at each of the selected time points, $t_1$-$t_5$, where the slope of composite current signal 604 changes and selecting the largest absolute current value. Peak current calculations are useful in a number of contexts (e.g., in finding the peak IR drop and the timing characteristics of the output signal) and this information changes when pin positions are changed.

At step 514, the updated average charging currents and average discharging currents determined in steps 508 and 510 are used to determine total average currents for each edge. For edges that are not terminated by a via, the total average current is determined as:

$$I_{avg} = \frac{\max(|I_{avg}^r|, |I_{avg}^f|) - \mathcal{R} \cdot \min(|I_{avg}^r|, |I_{avg}^f|)}{2} \quad (13)$$

for edges where the charging current and the discharging current are in opposite directions. In equation 13, $I_{avg}^r$ is the average charging current, $I_{avg}^f$ is the average discharging current, and R is the sweep back factor described above, which in some embodiments is selected as 0.7. When the charging and discharging currents are in the same direction, the total average current is calculated as:

$$I_{avg} = \frac{|I_{avg}^r| + |I_{avg}^f|}{2} \quad (14)$$

For edges that terminate in at a via, the total average current is determined by including the divergence currents at the via. For edges where the charging current and discharging current are in opposite directions, the total average current with divergence currents is determined as:

$$I_{avg} = \frac{\max(|I_{avg,d}^r|, |I_{avg,d}^f|) - \mathcal{R} \cdot \min(|I_{avg,d}^r|, |I_{avg,d}^f|)}{2} \quad (15)$$

where $I_{avg,d}^r = I_{avg}^r + \sum_{e \in E} I_{avg}^r(e)$ $$I_{avg,d}^f = I_{avg}^f + \sum_{e \in E} I_{avg}^f(e)$$

where E is the set of all edges other than the current edge that terminate at the via with currents into the via having a negative sign and currents away from the via having a positive sign, and $I_{avg}^r(e)$ and $I_{avg}^f(e)$ are the average charging current and average discharging current for each edge in E.

For edges where the charging current and discharging current are in the same direction at the via, the total average current with divergence currents is determined as:

$$I_{avg} = \frac{|I_{avg,d}^r| + |I_{avg,d}^f|}{2} \quad (16)$$

where $I_{avg,d}^r = I_{avg}^r + \sum_{e \in E} I_{avg}^r(e)$ $$I_{avg,d}^f = I_{avg}^f + \sum_{e \in E} I_{avg}^f(e)$$

At step 516, the average currents and RMS currents for each edge have been determined for the selected candidate pin position. The method then determines if there is another candidate pin position to consider. If there is, the next candidate pin position is selected by returning to step 500 and steps 502 through 514 are repeated for the new candidate pin position. When all of the candidate pin positions have been considered at step 516, the process of FIG. 5 ends at step 518 and the process of FIG. 3 continues at step 312.

At step 312, the Joule heating for each edge for each candidate pin position is determined by a Joule heating calculator 428 using the RMS currents determined in step 512 of FIG. 5. In accordance with one embodiment, the Joule heating is determined using equation 6 above. The values of the Joule heating for each edge for each candidate pin position are stored in memory for later use as Joule heating list 432. In addition, for each candidate pin position, the largest Joule heating value of any edge in the cell is stored as the Joule heating value for the candidate pin position in Joule heating list 432.

At step 314, a Time-To-Failure (TTF) calculator 426 determines a Time-To-Failure value for each edge for each candidate pin position using equations 1 and 5 above, the Joule heating determined in step 312 and a reference chip temperature, which in some embodiments is 398 K. For each candidate pin position, the shortest TTF value for any edge in the cell is stored as the TTF for the cell for that candidate pin position in a TTF list 430.

At step 316, the current adjuster 424 determines if there are more cells in the circuit to consider. If there are more cells in the circuit, the process returns to step 306 and a new cell is selected. Steps 308-314 are then repeated for the new cell.

When all of the cells of the circuit have been considered at step 316, the process continues at step 318 where a pin invalidator 434 identifies the candidate pin position that provides the longest TTF, also referred to as the best TTF, for each cell. The shortest such value over the entire circuit, also referred to as the shortest longest-time-to-failure, is the "weakest link" using the best possible pin positions, and is reported as the best or longest TTF for the circuit 436.

Next, optimization of the circuit is addressed with the objective of optimizing the lifetime of the circuit. To do this, at step 320, a TTF invalidator 438 invalidates candidate pin positions if the candidate pin position has a TTF that is shorter than the best TTF for the circuit 436. At step 322, a design requirement that limits the maximum allowable Joule heating in an edge is enforced by a Joule Heating Invalidator 440, which invalidates all candidate pin positions that have a Joule heating value that exceeds a threshold. In accordance with one embodiment, the threshold is set to a 5° K temperature rise. Steps 320 and 322 produce a set of invalid pin locations 442 for the cells in the circuit.

Invalid pin locations 442 are provided to place and route system 406. In accordance with one embodiment, invalid pin locations 442 are provided to place and route system 406 by changing the pin information in a Library Exchange Format (LEF) file to outlaw the invalid pin positions. At step 324, place and route system 406 determines revised placements and interconnects 444 that meet the best TTF by not using any pin plication that is found in invalid pin locations 442.

In other embodiments, the TTF values determined at step 314 can be provided to a Cell Library designer as feedback on the design of the cells in the library. Based on this feedback, the designer can alter one or more cells by, for example, using wider wires to make particular cells less susceptible to electromigration.

Figure 7:
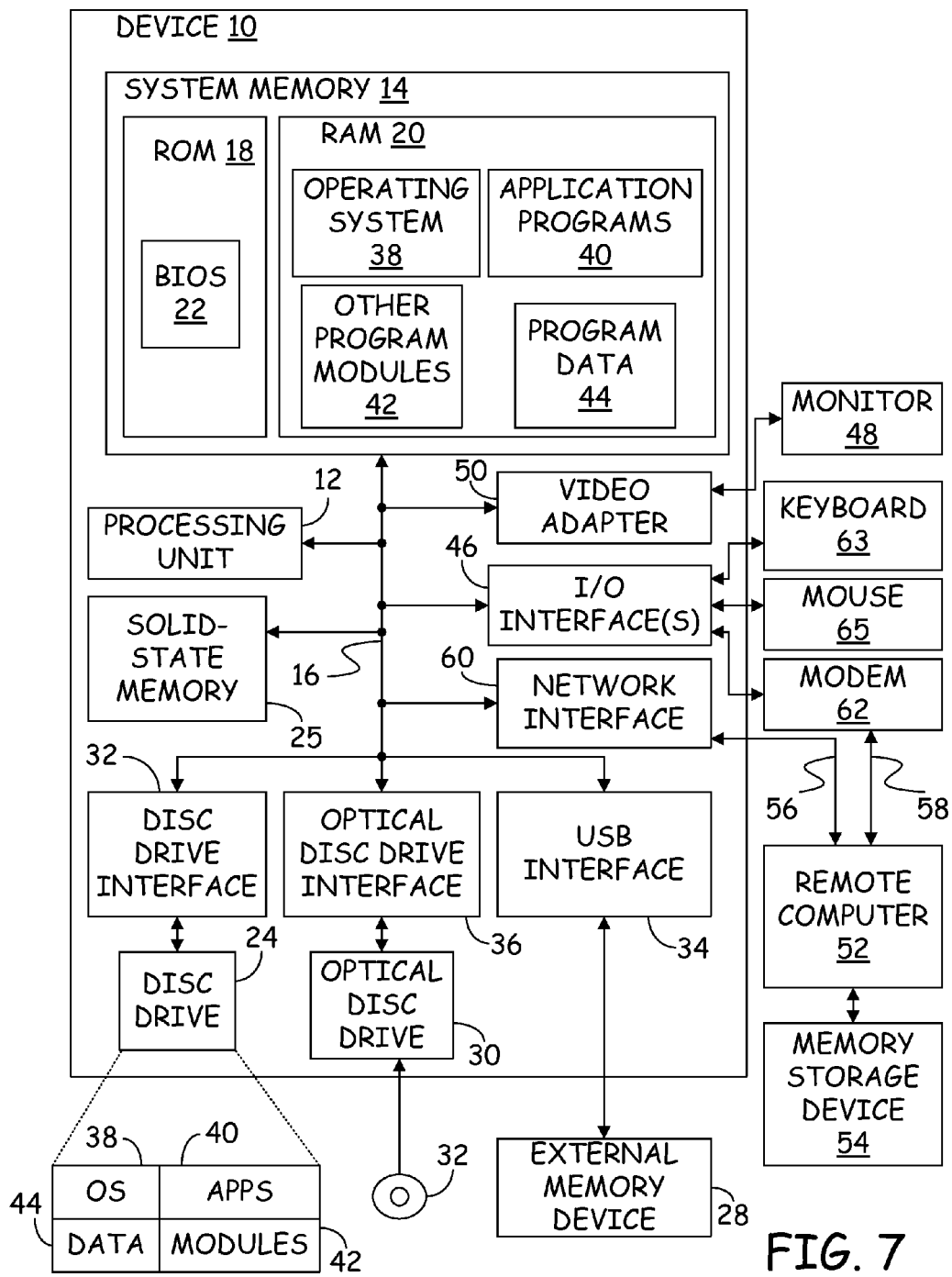
FIG. 7 provides a block diagram of elements found in a computing device that executes the steps of FIGS. 3 and 5.

An example of a computing device that can be used to implement the functional elements of FIG. 4 is shown in the block diagram of FIG. 7. The computing device 10 of FIG. 7 includes a processing unit 12, which is a hardware device, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for executing the methods described above. Program data 44 may include cell layouts 400, initial placement and interconnects 410, current matrix 404, determined loads and slews 414, reference currents 420, TTF list 430, Joule heating list 432, invalid pin locations 442, and revised placement and interconnects 444, for example.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 7. The network connections depicted in FIG. 7 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 7 are exemplary and other means for establishing a communications link between the computers, such as a wireless interface communications link, may be used.

Tables 1-4 below provide results achieved using the embodiments above. These results are based on scaling layouts in the NANGATE 45 nm cell library down to 22 nm. While this may not strictly obey all design rules at a 22 nm node, the transistor and wire sizes are comparable to 22 nm libraries, and so are the currents.

The results of tables 1-4 are also based on computing the TTF in Equation 1 using values of Q=0.85 eV, $T_m$=378K, and A=1.47×10$^7$ As/m$^2$ in SI units, which corresponds to an allowable current density of 10$^{10}$ A/m$^2$ over a lifetime of 10 years at 378K with an activation energy, Q=0.85 eV. Equations 2 and 3 were calculated using a recovery factor R of 0.7. For equation 6, the wire resistance, R, was obtained by parasitic extraction using a commercial tool, the dielectric thickness was set to $t_{ins}$=59 nm, and the thermal conductivity was set to $K_{ins}$=0.07 W/mK.

Initially the cells were characterized for the average and RMS currents in each cell under a reference pin position. The cells were characterized considering $f_{ref}$=1 GHz and for 7 different values each for the input slew and output load. The characterization thus generates a 7×7 look-up table with the RMS and average current values for the slew and load values, and these values were determined based on SPICE characterization of the scaled 22 nm library based on publicly available 22 nm SPICE ASU PTM models for the High Performance applications (PTM HP).

ITC'99 and ISCAS'89 benchmarks were synthesized using Design Compiler with delay specs set to the best achievable frequency. The cells from the NANGATE library were: NAND2_X2, NAND2_X4, NOR2_X2, NOR2_X4, AOI2I_X2, AOI2I_X4, INV_X4, INV_X8, INV_X16, BUF_X4, BUF_X8, BUF_X16, DFF_X2, DFFR_X2 and DFFS_X2. We focus on EM in the combinational cells.

Table 1 shows the results of the above characterization approach for a 22 nm library, derived from scaling a 45 nm library, based on a single SPICE simulation, followed by graph traversals and the current update algebra. One reference case is chosen for each cell and the number of candidate pin positions varies from six to twenty-five, with an average of about twelve pin candidates per cell. For this library, the number of SPICE simulations is therefore reduced by twelve times, significant and worthwhile savings even for a one-time library characterization task. The table shows the edge within each cell that shows the largest error for the effective average current: in each case, this error is seen to be small, and the computational savings for characterization are large.

TABLE 1

Comparison with SPICE for $I_{avg}$ calculated using algorithm of some embodiments. For each cell, the value corresponds to the edge current with the largest error.

| Cell | # Candidates | SPICE | Ours | Error (%) |
|---|---|---|---|---|
| NAND2_X2 | 8 | 4.72e−5 | 4.70e−5 | 0.32% |
| NAND2_X4 | 10 | 4.27e−5 | 4.37e−5 | 2.34% |
| NOR2_X2 | 6 | 2.74e−5 | 2.76e−5 | 0.72% |
| NOR2_X4 | 8 | 2.22e−5 | 2.31e−5 | 3.67% |
| AOI21_X2 | 8 | 3.81e−5 | 3.81e−5 | 0.09% |
| AOI21_X4 | 11 | 3.00e−5 | 3.08e−5 | 2.44% |
| INV_X4 | 7 | 9.84e−5 | 9.88e−5 | 0.46% |
| INV_X8 | 13 | 1.02e−4 | 1.02e−4 | 0.82% |
| INV_X16 | 25 | 1.29e−4 | 1.28e−4 | 0.63% |
| BUF_X4 | 7 | 3.12e−5 | 3.16e−5 | 1.31% |
| BUF_X8 | 13 | 1.12e−4 | 1.15e−4 | 2.70% |
| BUF_X16 | 25 | 1.24e−4 | 1.29e−4 | 3.85% |
| AVG | 11.8 | | | 1.61% |

Table 2 presents the results of our lifetime evaluation scheme for the set of library cells discussed above. Although the results are described below in connection with this library, these results in no way limit the invention to the selected library and are only provided as one example of improvements that can be achieved in the various embodiments. Similar improvements are expected with other cell libraries and other cell technologies.

The best and worst TTF values correspond to the largest and smallest lifetimes over all pin candidates. The TTF is calculated for two different switching activities of 50% and 100% of the clock frequency: although few cells in a layout switch frequently, it is likely one of these cells could be an EM bottleneck. The 100% switching case is a clear upper bound on the lifetime of the cell: typical cells, even worst-case cells, switch at a significantly lower rate, except on always-on networks such as core elements of the clock network. The table shows that the pin position is important: choosing the right pin position could change the lifetime by up to 16× for a 50% switching activity.

TABLE 2

TTF in years for each cell in the library.

| Cell | 50% switching | | 100% switching | |
|---|---|---|---|---|
| | Best TTF | Worst TTF | Best TTF | Worst TTF |
| NAND2_X2 | 19.11 | 19.03 | 9.42 | 9.41 |
| NAND2_X4 | 27.65 | 20.37 | 8.75 | 8.08 |
| NOR2_X2 | 19.29 | 19.29 | 8.82 | 8.81 |
| NOR2_X4 | 29.61 | 25.71 | 14.74 | 10.75 |
| AOI21_X2 | 16.65 | 16.59 | 8.26 | 7.96 |
| AOI21_X4 | 12.04 | 11.63 | 5.62 | 4.88 |
| INV_X4 | 23.23 | 9.90 | 11.49 | 4.73 |
| INV_X8 | 33.80 | 16.92 | 16.82 | 8.43 |
| INV_X16 | 30.80 | 2.42 | 15.31 | 0.20 |
| BUF_X4 | 25.85 | 12.93 | 12.64 | 6.35 |
| BUF_X8 | 40.93 | 13.55 | 20.35 | 6.01 |
| BUF_X16 | 35.91 | 3.17 | 17.65 | 0.50 |

Figure 8:
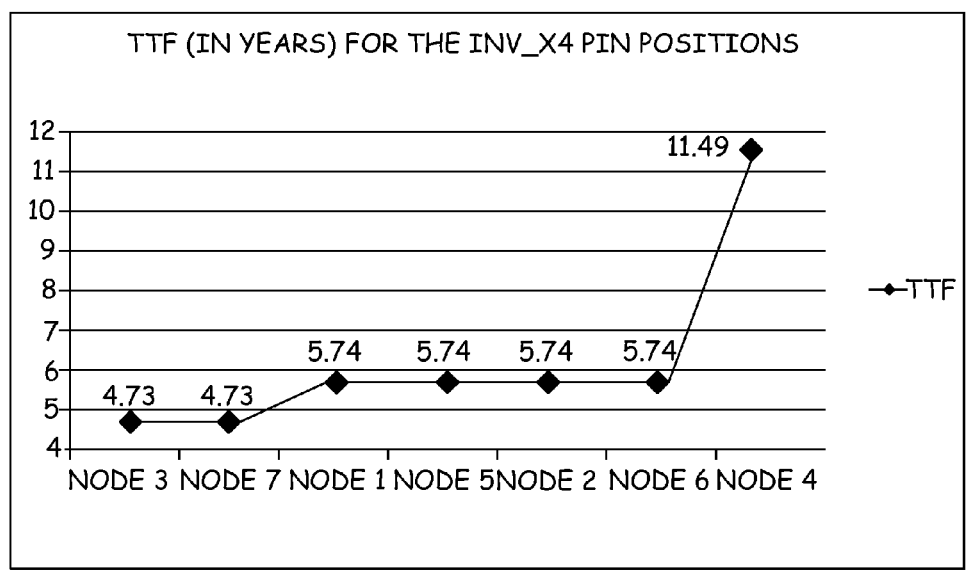
FIG. 8 provides a graph showing changes in the time to failure of a cell due to changes in the placement of a pin.

FIG. 8 shows a graph of TTF in years for the different pin positions for an INV_X4, considering a switching activity of 100%. It is possible to see a lifetime difference between the pin positions. When the pin is at node 4 of FIG. 1b, the TTF is 2× larger than when the pin is at node 2 or node 6 and 2.43× larger than when the pin is at node 3 or node 7. For this cell, the best TTF, i.e., the TTF achievable changing the pin position is 11.49 years and the worst TTF is 4.73 years.

Table 3 presents the results for a set of ITC'99 and ISCAS'89 benchmark circuits mapped to our set of characterized cells and placed-and-routed. For each benchmark circuit, the number of combinational cells, the clock period, total power consumption (leakage and switching power), area of core and total wirelength (WL) are presented, as reported by Encounter. The best and worst TTF values are computed as described above. These results correspond to a place-and-route layout with no EM awareness, and the gap between the best and worst TTF values indicates how much the lifetime can be improved. The number of critical nets corresponds to the nets that violate the Joule heating constraint, and the number of critical cells corresponds to the cells that have pin positions that correspond to lifetimes below the best TTF. Interestingly, these numbers are both small, implying that large improvements to the lifetime can be obtained through a few small changes to the layout. Note that the best TTF values are in the range required for many modern applications (e.g., mobile devices) with short TTF spans of 3-4 years.

TABLE 3

Cell-internal EM analysis for a set of benchmark circuits.

| Bench | # of comb. Cells | Period (ns) | Power (mW) | Area of core (μm²) | Total wire length (μm) | Worst TTF (years) | Best TTF (years) | TTF Improv. | # of critical nets | # of critical cells |
|---|---|---|---|---|---|---|---|---|---|---|
| b05 | 859 | 0.544 | 0.551 | 504 | 2682.50 | 4.07 | 6.53 | 37.59% | — | 4 |
| b07 | 461 | 0.306 | 0.352 | 317 | 1426.87 | 3.81 | 5.25 | 27.43% | — | 3 |
| b11 | 821 | 0.384 | 0.460 | 471 | 2439.83 | 2.75 | 5.82 | 52.80% | 1 | 5 |
| b12 | 1217 | 0.282 | 0.810 | 824 | 4236.15 | 3.13 | 3.14 | 0.15% | 3 | 1 |
| b13 | 340 | 0.208 | 0.467 | 272 | 1272.99 | 3.89 | 6.05 | 35.70% | 1 | 7 |
| s5378 | 1219 | 0.299 | 0.679 | 890 | 6418.27 | 2.74 | 3.59 | 23.67% | 2 | 1 |
| s9234 | 1044 | 0.373 | 0.584 | 849 | 4873.30 | 2.73 | 3.48 | 21.39% | — | 1 |
| s13207 | 1401 | 0.720 | 1.063 | 1733 | 7146.48 | 4.94 | 13.18 | 62.50% | — | 7 |
| s38417 | 10068 | 0.493 | 8.836 | 7959 | 46419.93 | 3.43 | 5.77 | 40.51% | 2 | 6 |

TABLE 4

Performance impact of EM-aware physical synthesis using pin optimization.

| Circuit | Period (ns) | Δ Period (%) | Power (mW) | Area (μm²) | WL (μm) | Δ WL (%) |
|---|---|---|---|---|---|---|
| b05 | 0.544 | — | 0.551 | 504 | 2682.6 | 0.00 |
| b07 | 0.306 | — | 0.353 | 317 | 1428.5 | 0.12 |
| b11 | 0.384 | — | 0.460 | 471 | 2443.5 | 0.15 |
| b12 | 0.280 | −0.89 | 0.808 | 824 | 4112.8 | −2.91 |
| b13 | 0.208 | — | 0.467 | 272 | 1273.5 | 0.04 |
| s5378 | 0.299 | — | 0.679 | 890 | 6422.2 | 0.06 |
| s9234 | 0.373 | — | 0.584 | 849 | 4873.4 | 0.00 |
| s13207 | 0.720 | — | 1.063 | 1733 | 7146.6 | 0.02 |
| s38417 | 0.493 | — | 8.836 | 7959 | 46420.2 | 0.00 |

Table 3 shows that the lifetime of a circuit can be improved by up to 62.50% by altering the pin position of a few cells. The benchmark where the TTF improvement is small is b12: the critical cell for this circuit is a NAND2_X2 where the worst TTF is 3.13 and the best TTF is 3.14, i.e. changing the pin position does not change the life-time significantly. The largest TTF improvement is for b11, where the critical cell is an INV_X4 where the worst TTF for this instance in the circuit is 4.94 years and the best TTF is 13.18 years.

The revised placements and interconnect routings 444 are formed to guarantee that the best TTF in Table 3 can be met by outlawing all pin positions whose TTF is worse than the best TTF in Table 3, or that result in a cell-internal Joule heating violation. Since the best TTF was computed by choosing the best pin position for each cell, and then finding the weakest link by determining the shortest TTF among these cells, a few cells may be forced to use a single pin. But most cells will have the choice between a number of pin positions, and the circuit lifetime will be significantly enhanced (by the definition of best TTF, each cell is guaranteed to have at least one allowable pin).

After these new constraints are imposed on the pin positions, the router makes incremental changes to some interconnect routes. Table 4 shows the results after physical synthesis considering using these new constraints. As shown in Table 4, the circuit lifetime is improved up to 62.50% (Table 3) while keeping the delay, area and power of the circuit unchanged, and with marginal changes (≤0.15%) to the total wire length (in fact, for one circuit, b12, the wire length and the clock period are even slightly improved). As there are only a few instances with critical pin positions and critical wire segments, the TTF can be increased without major changes in the circuit.

In the description above, Time-To-Failure has been used as an example performance parameter. However, the embodiments are not limited to Time-To-Failure determinations and the techniques for predicting the current flow through cell edges can be used for other performance parameters such as timing and IR drop, for example.

Although the present invention has been described with reference to preferred embodiments, workers skilled in the art will recognize that changes may be made in form and detail without departing from the spirit and scope of the invention.

What is claimed is:

1. A circuit design system comprising:
   a simulator that determines an average charging current provided by each current insertion point in a cell and an average charging current along a path in the cell between a reference pin position and a candidate pin position;
   a candidate pin placement tester that updates the average charging current along the path by adding the average charging current of each insertion point to the average charging current along the path to produce an updated average charging current along the path and using the updated average charging current along the path to determine a performance parameter value for the cell, wherein the performance parameter value comprises a time-to-failure for the cell; and
   a pin invalidator that invalidates candidate pin positions that have a performance parameter value below a threshold, wherein the pin invalidator sets the threshold by determining a candidate pin position for each cell in a circuit that provides a best performance parameter value for the cell and selecting the worst of the best performance parameter value as the threshold.

2. The circuit design system of claim 1 wherein the path comprises multiple segments and the average charging current along the path comprises a separate average charging current for each segment.

3. The circuit design system of claim 2 wherein adding the average charging current of each current insertion point comprises adding the average charging current of each current insertion point to the average charging current of each segment.

4. The circuit design system of claim 2 wherein each segment along the path is assigned a sign based on a direction traversed along the segment from the reference pin position to the candidate pin position such that adding the average charging current of each current insertion point to a segment's predicted average charging current comprises assigning the sign of the segment to the average charging current of each current insertion point to form signed average charging currents and summing the signed average charging currents with the average charging current of the segment.

5. The circuit design system of claim 1 wherein:
for each of a plurality of candidate pin positions:
the simulator determines an average charging current along a path in the cell between the reference pin position and the candidate pin position;
the candidate pin placement tester updates the average charging current along the path by adding the average charging current of each insertion point to the average charging current along the path to produce an update average charging current along the path; and
the candidate pin placement tester uses the updated average charging current along the path to determine a performance parameter value for the cell when the candidate pin position is used.

6. The circuit design system of claim 5 wherein the simulator and the candidate pin placement tester provided performance parameter values for a plurality of candidate pin positions for a plurality of cells in the circuit.

7. The circuit design system of claim 1 further comprising a place and route system that places cells, selects pin positions for each cell and interconnects the cells through the pins, wherein the place and route system does not select candidate pin positions that have been invalidated by the pin invalidator.

8. The circuit design system of claim 1 wherein the candidate pin placement tester further determines a root mean square charging current along the path and determines if Joule heating of the path exceeds a threshold based on the root mean square charging current.

9. The circuit design system of claim 1 wherein the candidate pin placement tester further determines a peak charging current along the path.

10. The circuit design system of claim 1 further comprising providing feedback to a library designer based on the performance parameter value.

11. A method comprising:
for each of a plurality of cells, designating respective candidate pin placements as invalid based on times to failure for segments of traces in each cell due to electromigration through steps comprising:
identifying a candidate pin placement of each cell in the plurality of cells that provides the longest time to failure for the cell;
selecting the shortest longest-time-to-failure of the plurality of cells as a threshold; and
designating as invalid all candidate pin placements with a time to failure that is shorter than the shortest longest-time-to-failure;
designating at least one additional candidate pin placement as invalid for at least one cell based on Joule heating of a segment; and
placing and routing interconnects between cells for a circuit such that the interconnects are prevented from connecting to the invalid candidate pin placements and are prevented from connecting to the invalid at least one additional candidate pin placement that are present in the cells.

12. The method of claim 11 wherein identifying a candidate pin placement for each cell that provides the longest time to failure for the cell comprises:

placing and routing interconnects between the plurality of cells to form a circuit using a reference pin location for each cell;
simulating operation of the circuit to determine an average current for each segment in each cell, an average current for each current insertion point in each cell and an average current for each current sink point in each cell;
for each candidate pin placement in each cell:
identifying segments connecting the reference pin location to the candidate pin placement;
modifying the average current on each identified segment based on the average current of at least one of the current insertion points and the current sink points;
using the modified average current of each segment to determine a time to failure for the segment for the candidate pin placement.

13. The method of claim 12 wherein identifying a candidate pin placement for each cell that provides the longest time to failure further comprises:
simulating operation of the circuit to determine a root mean square current for each segment in each cell, a root mean square current for each current insertion point in each cell and a root mean square current for each current sink point in each cell;
for each candidate pin placement in each cell:
modifying the root mean square current on each identified segment based on the root mean square current of at least one of the current insertion points and the current sink points;
using the modified root mean square current of each identified segment to determine the time to failure for the segment for the candidate pin placement.

14. The method of claim 12 wherein modifying the average current on an identified segment based on the average current of at least one of the current insertion points and the current sink points comprises assigning a sign to the average current on the identified segment based on the direction of the average current, assigning a sign to the average current of at least one of the current insertion points and current sink points based on a direction of travel along the segment from the reference pin location to the candidate pin placement and summing the signed average current on the identified segment with the signed average current of at least one of the current insertion points and current sink points.

15. The method of claim 12 wherein using the modified average current of each segment to determine a time to failure for the segment comprises using the modified average current to determine an average divergence current and using the average divergence current to determine the time to failure.

16. A computer-readable storage medium having computer-executable instructions that when executed by a processor cause the processor to perform steps comprising:
placing cells and interconnecting the cells using reference pin positions for each cell;
for each cell, identifying a time to failure for the cell due to electromigration for a plurality of pin positions and determining which pin position results in the longest time to failure for the cell;
identifying the earliest failing cell by determining the earliest of the longest-time-to-failure due to electromigration;

designating as invalid the pin positions that result in times to failure due to electromigration that are shorter than the earliest longest-time-to-failure due to electromigration; and placing the cells and interconnecting the cells by selecting from a set of candidate pin positions that excludes the pin positions designated as invalid.

17. The computer-readable storage medium of claim 16 wherein identifying a time to failure for a cell due to electromigration for a pin position comprises:

determining a change to current values along at least one edge of a cell that will occur if the pin position is used instead of the reference pin position;

determining a divergence current value for at least one edge in the cell from the changed current values; and using the divergence current value to determine a time to failure for at least one edge due to electromigration.

18. The computer-readable storage medium of claim 17 wherein determining a change to current values along at least one edge of a cell comprises identifying a path between the reference pin position and the pin position and determining a change to a current value for each edge along the path.

19. The computer-readable storage medium of claim 18 wherein determining a change to current values for an edge along the path comprises adding average currents of all insertion points in the cell to an average current value for the edge.

* * * * *